United States Patent [19]

Watanabe et al.

[11] Patent Number: 4,586,330

[45] Date of Patent: May 6, 1986

[54] CONTROL SYSTEM FOR HYDRAULIC CIRCUIT APPARATUS

[75] Inventors: Hiroshi Watanabe; Eiki Izumi; Yukio Aoyagi; Kazuo Honma; Kichio Nakajima, all of Ibaraki, Japan

[73] Assignee: Hitachi Construction Machinery Co., Ltd., Tokyo, Japan

[21] Appl. No.: 401,304

[22] Filed: Jul. 23, 1982

[30] Foreign Application Priority Data

Jul. 24, 1981 [JP] Japan ................................ 56-115311

[51] Int. Cl.⁴ ................................................ F16H 59/46

[52] U.S. Cl. .......................................... 60/421; 60/422; 60/427; 60/428; 60/465; 60/469

[58] Field of Search .................. 60/327, 368, 394, 420, 60/421, 422, 427, 428, 429, 449, 465, 469, 484, 486, 911, 389, 390; 417/216

[56] References Cited

U.S. PATENT DOCUMENTS

| | | | |
|---|---|---|---|
| 3,060,858 | 10/1962 | Shoosmith | 417/216 |
| 4,113,054 | 9/1978 | Myers | 60/421 |
| 4,369,625 | 1/1983 | Izumi et al. | 60/327 |
| 4,395,199 | 7/1983 | Izumi et al. | 60/449 |
| 4,399,653 | 8/1983 | Pylat, Jr. | 60/327 |

*Primary Examiner*—Charles T. Jordan
*Assistant Examiner*—Richard Klein
*Attorney, Agent, or Firm*—Antonelli, Terry & Wands

[57] ABSTRACT

A control system for a hydraulic circuit including at least first and second variable displacement volume type hydraulic pumps, at least first and second hydraulic actuators driven by the pumps, and valves for controlling hydraulic connections between the pumps and the actuators. The control system includes a device for deciding the order of priority of hydraulic connections between the first actuator and the first and second hydraulic pumps and the order of priority of hydraulic connections between the second pump and the first and second actuators. A first sensor is provided for sensing maximization of the displacement volume of the first pump, sensing that the displacement volume of the second pump has become substantially zero. A device decides target displacement volumes of the first and second pumps based on information supplied at least by the priority order deciding device and first and second sensor. When the flow rate of hydraulic fluid supplied to the first actuator is increased, the displacement volume of the second pump is increased from substantially zero after the displacement volume of the first pump is maximized. When the flow rate of hydraulic fluid supplied to the first actuator is reduced, the displacement volume of the first pump is reduced after the displacement volume of the second pump has become substantially zero.

6 Claims, 22 Drawing Figures

FIG. 7
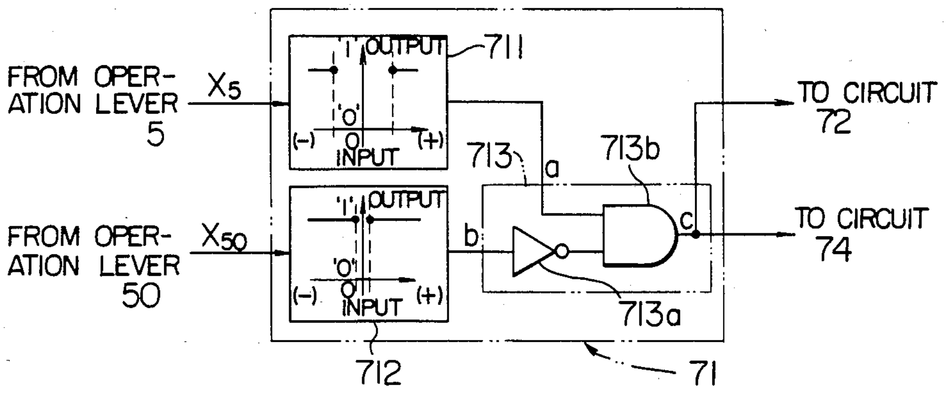
FIG. 8
RELATION BETWEEN a AND b INPUTS AND c OUTPUT OF LOGICAL CIRCUIT 713
| b \ a | '0' | '1' |
|---|---|---|
| '0' | '0' | '1' |
| '1' | '0' | '0' |
FIG. 10
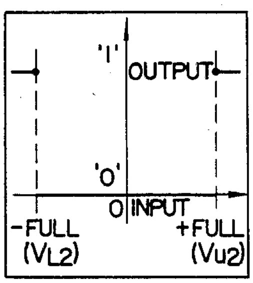
RELATION BETWEEN INPUT AND OUTPUT OF CIRCUIT 76
FIG. 9
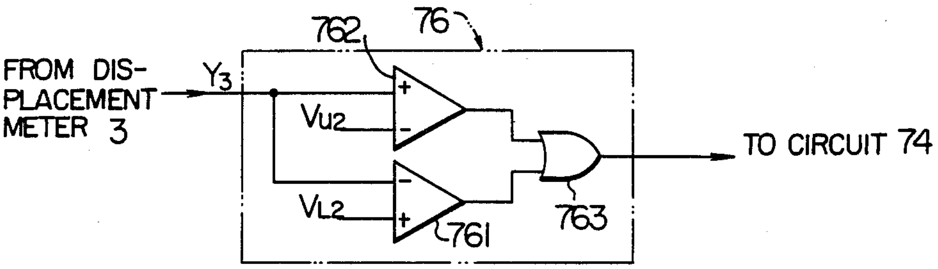

FIG. 11
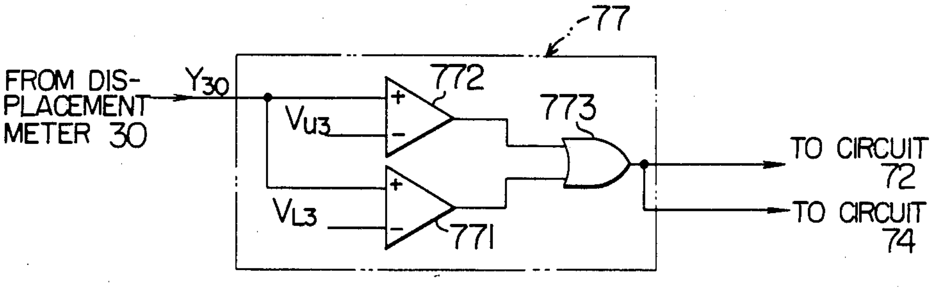
FIG. 12
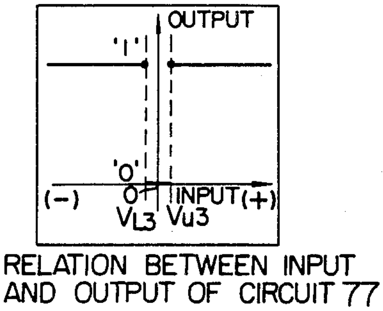
RELATION BETWEEN INPUT AND OUTPUT OF CIRCUIT 77
FIG. 14
RELATION BETWEEN S AND R INPUTS AND $\overline{Q}$ OUTPUT OF RS FLIP-FLOP CIRCUIT 724
| R \ S | '0' | '1' |
|---|---|---|
| '0' | — | '1' |
| '1' | '0' | KEEP |
FIG. 13
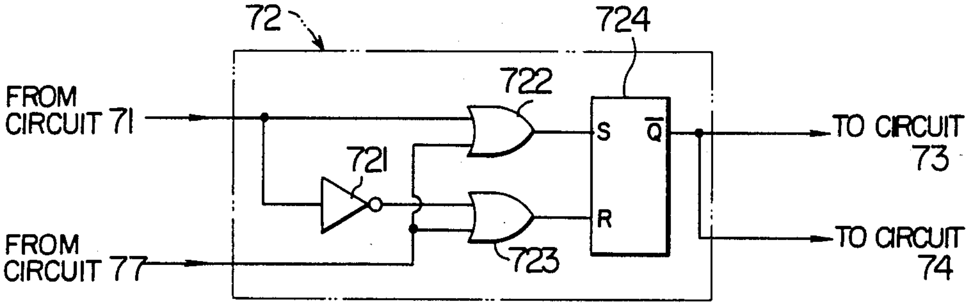

RELATION BETWEEN INPUTS AND OUTPUT OF LOGICAL CIRCUIT 748

| INPUTS | | | OUTPUT |
|---|---|---|---|
| a | b | c | d |
| '0' | '1' | '0' | '1' |
| '1' | '1' | '0' | '1' |
| '0' | '1' | '1' | '1' |
| '1' | '1' | '1' | '0' |

CONTROL SYSTEM FOR HYDRAULIC CIRCUIT APPARATUS

BACKGROUND OF THE INVENTION

1. Field of the Invention

This invention relates to hydraulic circuit for construction machines such as, for example, a hydraulic excavator, hydraulic crane, etc., and, more particularly, to a control system for the hydraulic circuit apparatus adapted to effect a control of actuator speeds by controlling the displacement volume of a hydraulic pump.

2. Description of the Prior Art

One type of hydraulic circuit apparatus of a construction machine such as a hydraulic excavator, hydraulic crane, etc., known in the art comprises at least first and second variable displacement hydraulic pumps, at least first and second hydraulic actuators driven by the first and second hydraulic pumps, and valve means for controlling hydraulic connections between the hydraulic pumps and the actuators. In this type of hydraulic circuit apparatus, the speeds of the first and second actuators are controlled by controlling the displacement volumes of the first and second hydraulic pumps, with the driving directions of the first and second actuators being preferably controlled by controlling the delivery directions of the first and second hydraulic pumps, and with the first actuator being driven by both the first and second hydraulic pumps by controlling the valve means. However, in the control system of the prior art the problem arises that, when the first actuator is driven by both the first and second hydraulic pumps, acceleration or deceleration of the first actuator undergoes stepwise abrupt changes after operation of the first actuator is initiated until its speed becomes constant and after reduction in speed thereof is initiated until it is brought to a halt, so that the circuit apparatus exhibits poor operational characteristics and a great force of shock is exerted on the machine. In a control system proposed in an effort to avoid this stepwise abrupt change in acceleration or deceleration, it is imperative that when it is desired to drive the second actuator by means of the second hydraulic pump by actuating the valve means when the first actuator is driven by both the first and second hydraulic pumps, actuation of the valve means be effected after rendering the displacement volume of the second hydraulic pump zero in order to avoid a shock that might otherwise be given to the actuators. Thus, the second actuator might not become operative immediately at the time the operation lever is manipulated and there might be a time lag in starting operation of the second actuator. Also, the hydraulic pumps might have a high incidence of changes in displacement volumes.

SUMMARY OF THE INVENTION

This invention has as its object the provision, for the hydraulic circuit of a construction machine, of a control system which is capable of maintaining acceleration or deceleration of the actuators constant, and which enables the actuator to start operating simultaneously with the manipulation operation, and which can minimize the incidence of changes in the displacement volumes of the hydraulic pumps.

According to the invention, a control system for a hydraulic circuit of a construction machine is provided which comprises at least first and second variable displacement type hydraulic pumps, at least first and second hydraulic actuators, driven by the first and second pumps, and valve means for controlling hydraulic connections between the hydraulic pumps and the actuators, with means also being provided for deciding the order of priority of hydraulic connections between the first actuator and the first and second hydraulic pumps and the order of priority of hydraulic connections between the second hydraulic pump and the first and second actuators, first means for sensing maximization of the displacement volume of the first hydraulic pump, second means for sensing that the displacement volume of the second hydraulic pump has become substantially zero, and means for deciding target displacement volumes of the first and second hydraulic pumps based on information supplied at least by said priority order deciding means and said first and second sensing means whereby when the flow rate of hydraulic fluid supplied to the first actuator is increased, the displacement volume of the second hydraulic pump is increased from substantially zero after the displacement volume of the first hydraulic pump is maximized and, when the flow rate of hydraulic fluid supplied to the first actuator is reduced, the displacement volume of the first hydraulic pump is reduced after the displacement volume of the second hydraulic pump has become substantially zero.

DESCRIPTION OF THE DRAWINGS

FIG. 7 is a circuit diagram of the priority order judging circuit of the control system shown in FIG. 5;

FIG. 8 is a table showing the relationship between the inputs and output of the logical circuit shown in FIG. 7;

FIG. 9 is a circuit diagram of the maximum tilting sensing means of the control system shown in FIG. 5;

FIG. 10 is a diagram showing the relationship between the input and output of the maximum tilting sensing circuit shown in FIG. 9;

FIG. 11 is a circuit diagram of the zero tilting sensing means of the control system shown in FIG. 5;

FIG. 12 is a diagram showing the relationship between the input and output of the zero tilting sensing means shown in FIG. 11;

FIG. 13 is a circuit diagram of the valve switch timing circuit of the control system shown in FIG. 5;

FIG. 14 is a table showing the relationship between the inputs and output of the RS flip-flop circuit of the timing circuit shown in FIG. 13;

DESCRIPTION OF THE PREFERRED EMBODIMENTS

Figure 1:
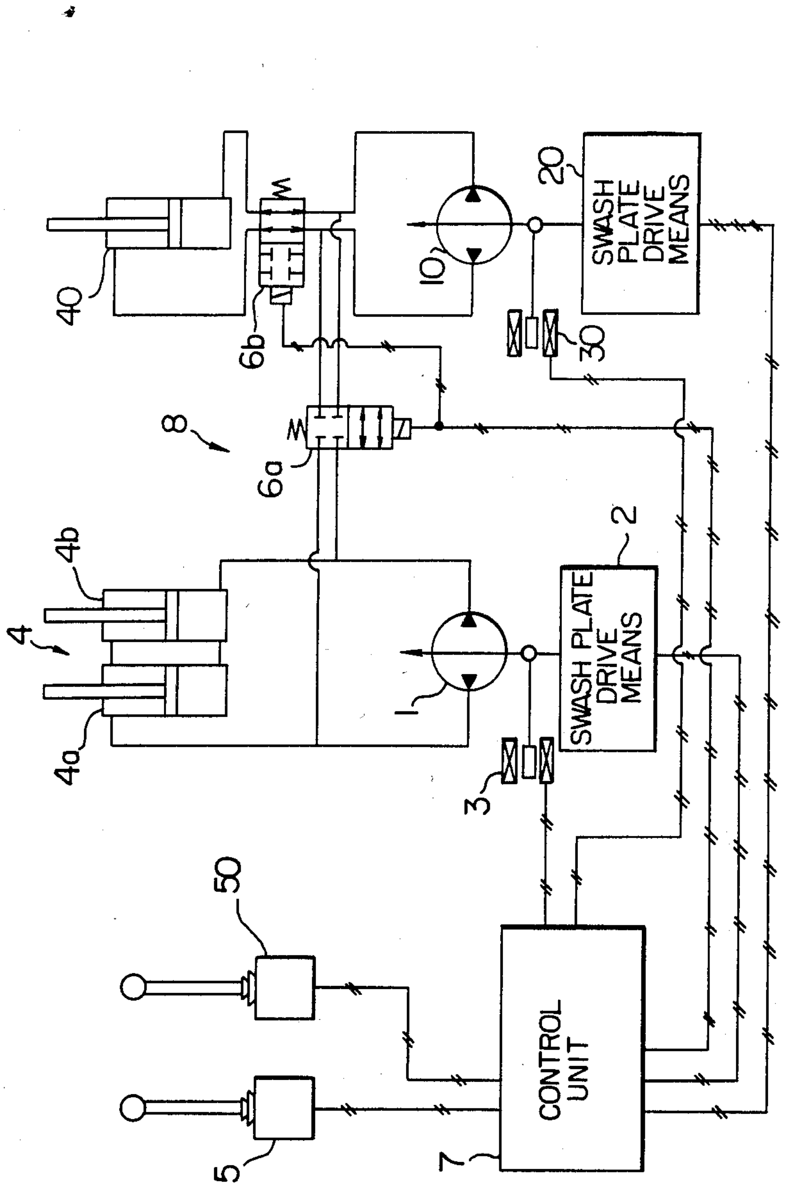
FIG. 1 is a schematic view of a hydraulic circuit and control system therefor for controlling the driving speeds and directions of actuators by controlling the displacement volumes and delivery directions of hydraulic pumps.

Referring to FIG. 1, a hydraulic circuit generally designated by the reference numeral 8 controls the driving speeds and directions of actuators by controlling the displacement volumes and delivery directions of hydraulic pumps, with the hydraulic circuit 8 including first and second variable displacement hydraulic pumps 1 and 10 of the double tilting type, swash plate drive means 2 and 20 for respectively varying the displacement volumes of the pumps 1 and 10, displacement meters 3 and 30 for respectively sensing the positions of the swash plates of the pumps 1 and 10, first and second actuators 4 and 40 driven by the pumps 1 and 10, operation levers 5 and 50 for generating signals for instructing the speeds of the actuators 4 and 40, and solenoid-operated on-off valves 6*a* and 6*b* for selectively supplying hydraulic fluid from the pump 10. Signals from the displacement meters 3 and 30 and operation levers 5 and 50 are inputted to a control unit 7 which supplies control signals as its outputs to the swash plate drive means 2 and 20 and on-off valves 6*a* and 6*b*. The hydraulic pumps 1 and 10 have the same maximum displacement volume. The actuator 4 comprises a cylinder unit having a pair of hydraulic cylinders 4*a* and 4*b* and having the maximum flow rate requirement which corresponds to the flow rate of fluid delivered by two pumps, and the actuator 40 comprises a single cylinder unit having the maximum flow rate requirement which corresponds to the flow rate of fluid delivered by one pump.

Figure 2:
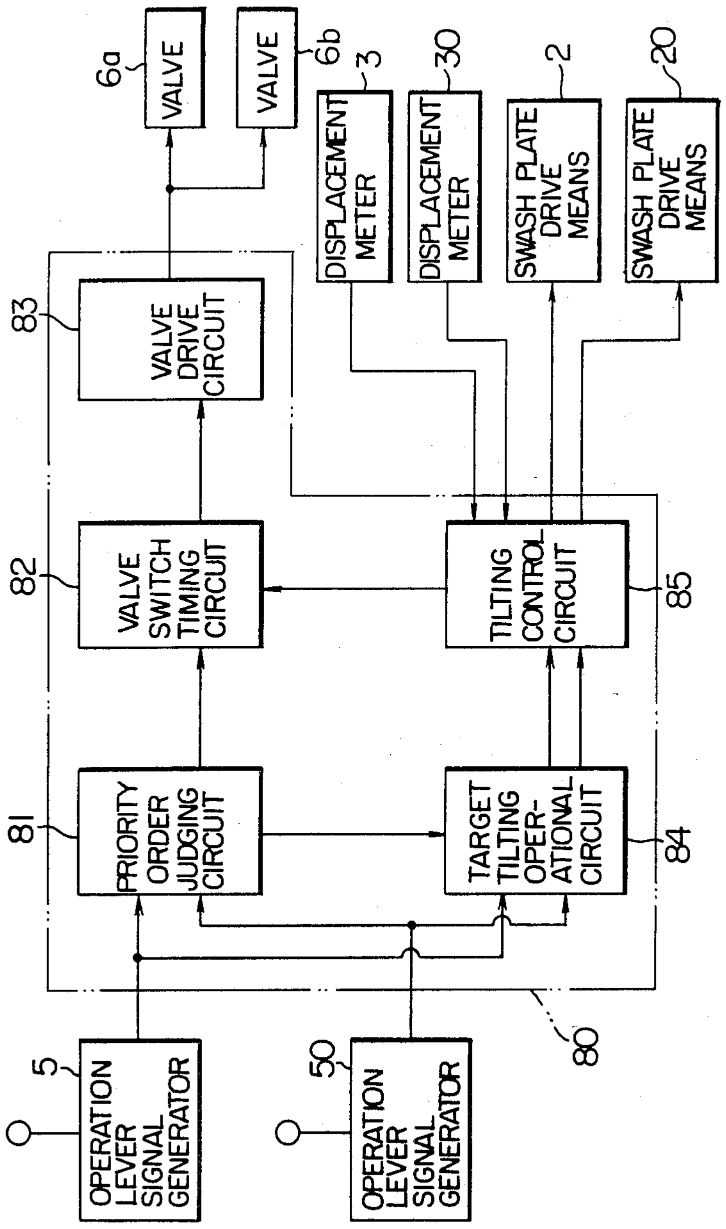
FIG. 2 PRIOR ART
FIG. 2 is a schematic view of a control system of the prior art.

Referring to FIG. 2, a prior art control unit 80 comprises a circuit 81 for judging the order of priority of hydraulic connections between the hydraulic pumps 1 and 10 and the hydraulic cylinders 4 and 40 based on signals from the operation levers 5 and 50, an operational circuit 84 for calculating target tiltings of the swash plates of the hydraulic pumps 1 and 10 based on signals from the operation levers 5 and 50 and a signal from the judging circuit 81, a tilting control circuit 85 for supplying a tilting signal to each of the swash plate drive means 2 and 20 based on signals from the displacement meters 3 and 30 and a signal from the operation circuit 84, a timing circuit 82 for controlling timing of switching of the on-off valves 6*a* and 6*b* based on a signal from the judging circuit 81 and a tilting signal from the tilting control circuit 85, and an on-off valve drive circuit 83 for effecting switching of the on-off valves 6*a* and 6*b* based on a switch signal from the timing circuit 82.

The hydraulic pump 1 is exclusively for driving the hydraulic cylinders 4, but the hydraulic pump 10 is preferentially hydraulically connected to the hydraulic cylinder 40, and when the hydraulic cylinder 40 is not driven and the hydraulic cylinders 4 are driven, the hydraulic pump 10 is hydraulically connected to the hydraulic cylinders 4. In this case, the judging circuit 81 effects control in such a manner that the hydraulic pump 1 takes priority over the hydraulic pump 10 in being hydraulically connected to the hydraulic cylinders 4. In hydraulic excavators and the like, if the hydraulic cylinders 4 and 40 are abruptly driven a force of shock of a high magnitude would be exerted on the body, making it impossible to perform operation. Thus, the tilting control circuit 85 is provided to effect control of the tilting speed of the swash plates of the hydraulic pumps 1 and 10 in such a manner that predetermined levels are not exceeded by the tilting speeds of the hydraulic pumps 1 and 10 even if the speeds at which the operation levers 5 and 50 are manipulated are high.

Figure 3:
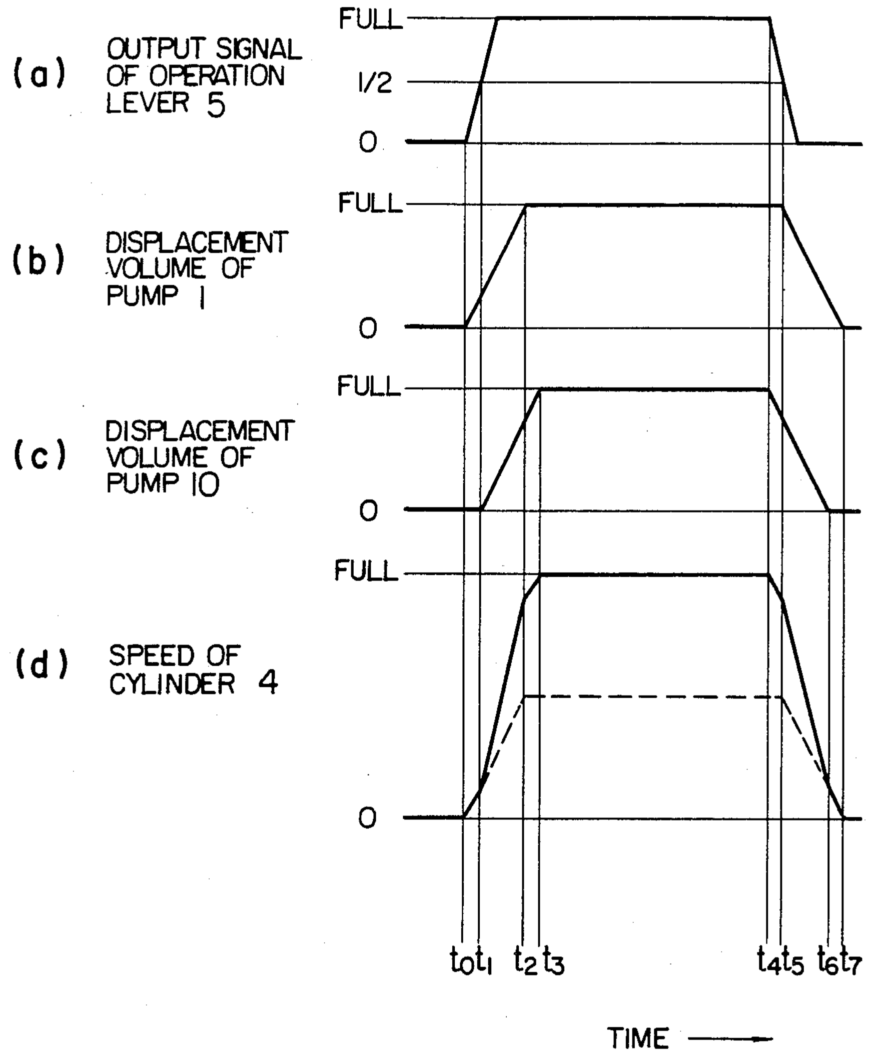
FIG. 3 PRIOR ART
FIGS. 3 and 4 are time charts showing the operation of the control system of the prior art.

As shown in FIG. 3, upon the operation lever 5 alone being manipulated at a time $t_o$, the swash plate of the hydraulic pump 1 which takes priority over the hydraulic pump 10 for hydraulic connection to the hydraulic cylinders 4, begin tilting to increase the displacement volume of the pump 1. At a time $t_1$, at which the value of a signal from the operation lever reaches one-half the maximum value thereof, the on-off valve 6*a* is brought to an open position and the on-off valve 6*b* is brought to a closed position. At the same time, the swash plate of the hydraulic pump 10 begin tilting to increase the displacement volume thereof. In this case, the tilting speed control prevents actual tilting of the swash plates of the hydraulic pumps 1 and 10 from coinciding with the signal from the operation lever 5, so that the displacement volume of the pump 1 is maximized at a time $t_2$ while the displacement volume of the pump 10 is maximized at a time $t_3$. Thus, acceleration of the hydraulic cylinders 4 from time $t_1$ to time $t_2$ becomes twice as high as acceleration of the hydraulic cylinders 4 from time $t_o$ to time $t_1$ and from time $t_2$ to time $t_3$. By returning the operation lever 5 to a neutral position at a time $t_4$, the swash plate of the hydraulic pump 10, lower in the order of priority for hydraulic connection to the hydraulic cylinders 4, begins to decrease in tilting to reduce the displacement volume of the pump 10. At a time $t_5$, at which the value of a signal from the operation lever 5 becomes $\frac{1}{2}$ the maximum value thereof, the swash plate of the hydraulic pump 1 begins to decrease in tilting, and at a time $t_6$, at which the displacement volume of the pump 10 becomes zero, the on-off valve 6*a* is closed and the on-off valve 6*b* is opened. At a time $t_7$, the displacement volume of the pump 1 becomes zero. Thus, deceleration of the hydraulic cylinder 4 from time $t_5$ to time $t_6$ becomes twice as high as deceleration of the hydraulic cylinders 4 from time $t_4$ to time $t_5$ and from time $t_6$ to time $t_7$. The acceleration or deceleration of the hydraulic cylinder 4 undergoes changes in this fashion, so that operational characteristics thereof are low and a force of shock of a high magnitude is exerted on the body when the acceleration or deceleration undergoes changes.

Figure 4:
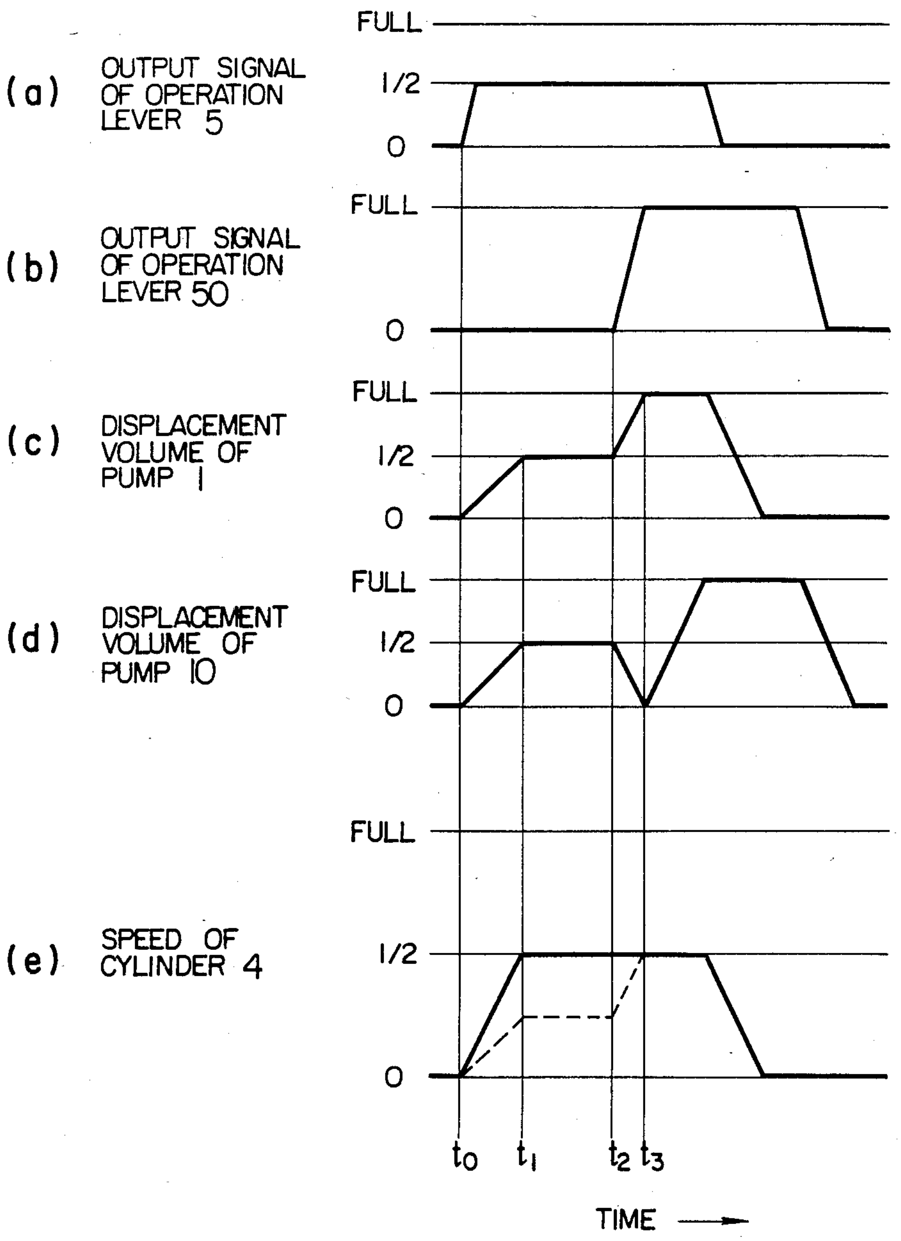
FIG. 4 PRIOR ART

To obviate this disadvantage, proposals have been made to simultaneously supply hydraulic fluid to the hydraulic cylinders 4 from the hydraulic pumps 1 and 10 when the operation lever 5 is manipulated. This operation will be described by referring to a time chart shown in FIG. 4.

As the operation lever 5 is manipulated and moved one-half of its maximum amount of movement at a time $t_o$, the on-off valve 6*a* is opened and on-off valve 6*b* is closed while the displacement volumes of the hydraulic pumps 1 and 10 simultaneously increase. This makes the acceleration of the hydraulic cylinders 4 constant. However, if the operation lever 50 is moved a maximum amount at a time $t_2$, in order to avoid the trouble that the hydraulic cylinder 40 would be suddenly actuated and a force of shock of a high magnitude would be produced, the displacement volume of the hydraulic pump 1 is increased and the displacement volume of the hydraulic pump 10 is decreased at the time $t_2$, and the on-off valve *6a* is closed and on-off valve *6b* is opened at a time $t_3$ at which the displacement volume of the pump 1 is maximized and the displacement volume of the pump 10 becomes zero, and then the displacement volume of the pump 10 begans to increase. Thus, operation of the hydraulic cylinder 40 is not initiated at time $t_2$ at which the operation lever 50 is manipulated, but the hydraulic cylinder 40 begins to operate at time $t_5$. Also, if the operation lever 50 is manipulated while the operation lever 5 is being manipulated, then the displacement volume of the hydraulic pump 1 increases and the displacement volume of the hydraulic pump 10 increases after decreasing once. Thus, the pumps 1 and 10 have a high incidence of changes in the displacement volumes thereof.

The control unit 7 according to the invention contemplates avoiding the aforesaid problems to make the acceleration or deceleration of the actuators constant and render the actuator operative as soon as the operation lever is manipulated, as well as to minimize the incidence of changes in the displacement volumes of the pumps.

Figure 5:
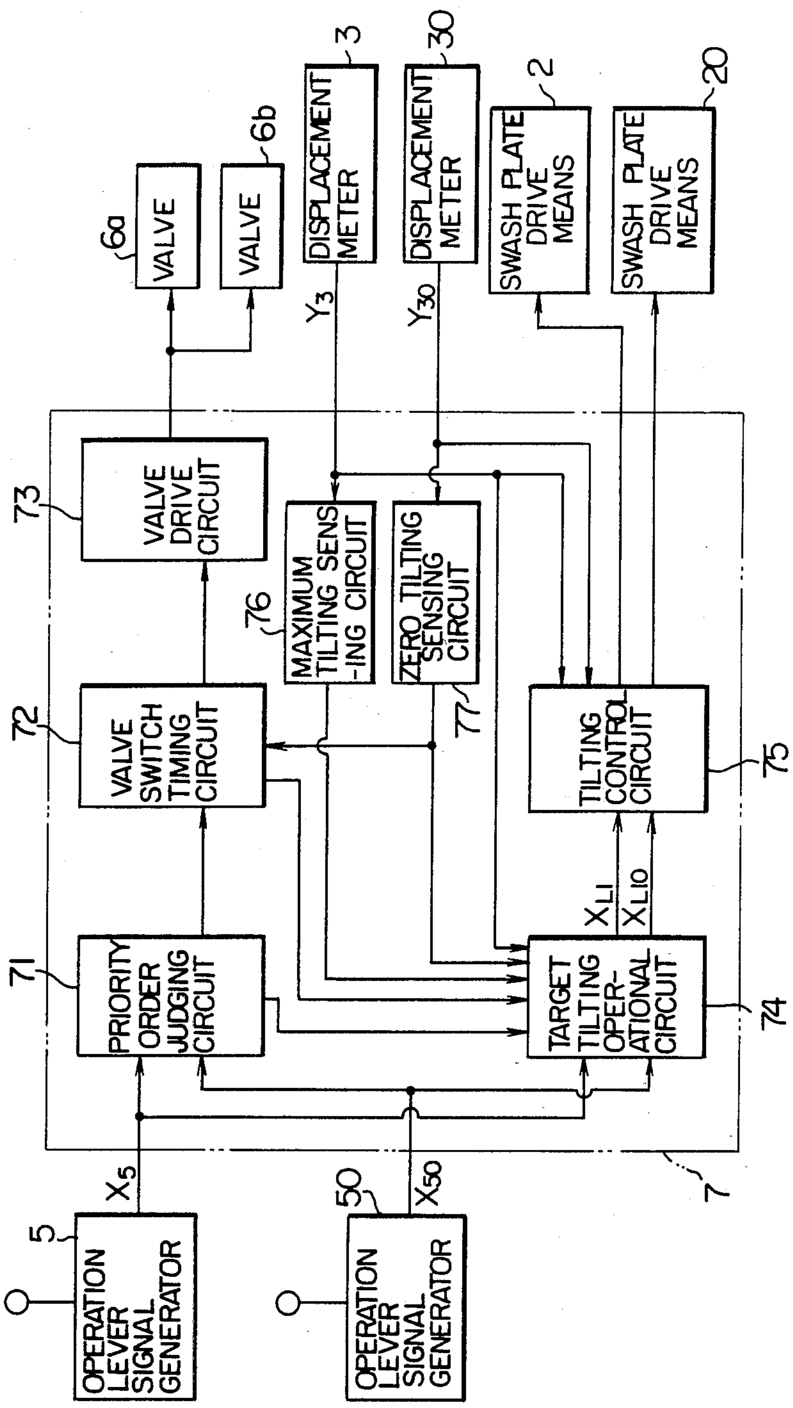
FIG. 5 is a schematic view of the control system comprising one embodiment of the invention.

As shown in FIG. 5, the control unit 7 comprises a judging circuit 71 for judging the order of priority of hydraulic connections between the hydraulic pump 10 and the hydraulic cylinders 4 and 40 and the order of priority of hydraulic connections between the hydraulic cylinders 4 and the hydraulic pumps 1 and 10 based on signals from the operation levers 5 and 50, a swash plate maximum tilting sensing circuit 76 for sensing based on a signal $Y_3$ from the displacement meter 3 that the absolute value of swash plate tilting of the hydraulic pump 1 has become maximized, a swash plate zero tilting sensing circuit 77 for sensing based on a signal $Y_{30}$ from the displacement meter 30 that swash plate tilting of the hydraulic pump 10 is zero, a timing circuit 72 for deciding timing for switching the on-off valves *6a* and *6b* based on signals from the judging circuit 71 and the zero tilting sensing circuit 77, a drive circuit 73 for effecting switching of the on-off valves *6a* and *6b* based on a signal from the timing circuit 72, an operational circuit 74 for determining target tiltings of the swash plates of the hydraulic pumps 1 and 10 based on operation signals $X_5$ and $X_{50}$ from the operation levers 5 and 50, a signal from the valve switch timing circuit 72, a signal $Y_3$ from the displacement meter 3 and signals from the sensing circuits 76 and 77, and a tilting control circuit 75 for supplying to the swash plate drive means 2 and 20 tilting signals based on signals from the displacement meters 3 and 30 and a signal from the operational circuit 74. The hydraulic pump 1 is exclusively for driving the hydraulic cylinders 4, but the hydraulic pump 10 is preferentially hydraulically connected to the hydraulic cylinder 40 and, when the hydraulic cylinder 40 is not driven and the hydraulic cylinders 4 is driven, the hydraulic pump 10 is hydraulically connected to the hydraulic cylinders 4. In this case, the judging circuit 71 effects control such that the hydraulic pump 1 takes priority over the hydraulic pump 10 for hydraulic connection to the hydraulic cylinders 4. In hydraulic excavators and the like, when the hydraulic cylinders 4 and 40 are abruptly driven, the body would receive a force of shock of a high magnitude and might become impossible to drive. Thus, the tilting control circuit 75 is provided for controlling tilting speed in such a manner that even if the speeds of manipulation of the operation levers 5 and 50 are high, predetermined levels are not exceeded by swash plate tilting speeds of the hydraulic pumps 1 and 10.

When the operation lever 5 is manipulated and a signal is inputted to the operational circuit 74 from the judging circuit 71 for hydraulically connecting the hydraulic pump 1 to the hydraulic cylinders 4 by taking priority over the hydraulic pump 10, the operational circuit 74 does operation, when the signal of the operation lever 5 increases, to provide a target tilting for keeping the swash plate tilting of the hydraulic pump 10 at zero until a signal is inputted from the sensing circuit 76 indicating that the swash plate tilting of the pump 1 is maximized, and when the signal of the operation lever 5 decreases, to provide a target tilting for keeping the swash plate tilting of the hydraulic pump 1 at a maximum value until a signal is inputted from the sensing circuit 77 indicating that the swash plate tilting of the pump 10 has become zero.

Figure 6:
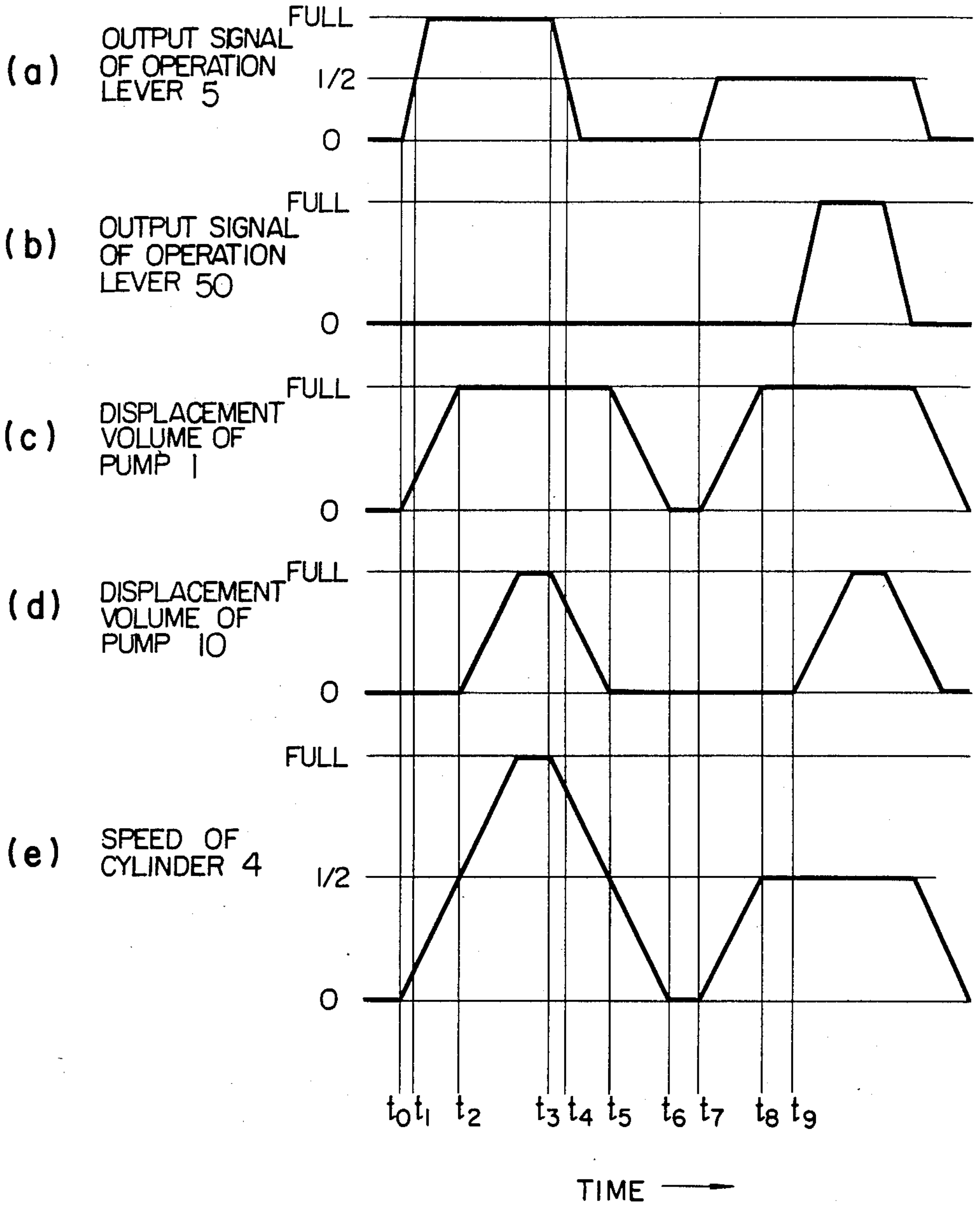
FIG. 6 is a time chart showing the operation of the control system according to the invention.

As shown in FIG. 6, when the operation lever 5 is manipulated to generate a signal $X_5$ at a time $t_o$, the circuit 71 judges that the hydraulic pump 1 should take priority over the pump 10 for hydraulic connection to the hydraulic cylinders 4, and the operational circuit 74 operates to provide a target tilting to increase the swash plate tilting of the pump 1 to thereby increase the displacement volume of the pump 1. If the signal $X_5$ of the operation lever 5 exceeds one-half the maximum value thereof at a time $t_1$, then the judging circuit 71 judges that the pump 10 should be hydraulically connected to the hydraulic cylinders 4. However, since tilting speed control is being effected by the tilting control circuit 75, the sensing circuit 76 does not supply a signal because the swash plate tilting of the pump 1 is not maximized yet. Thus, the operational circuit 74 operates to provide a target tilting for keeping the swash plate tilting of the pump 10 at zero. If the swash plate tilting of the pump 1 is maximized at a time $t_2$, then the sensing circuit 76 supplies a signal and the operational circuit 74 operates to provide a target tilting for increasing the swash plate tilting of the pump 10. At this time, the on-off valve *6a* is opened and the on-off valve *6b* is closed, and thus the displacement volume of the pump 10 to increase thereby making the acceleration of the pump 10 constant. Also, if the operation lever 5 begins to be returned to a neutral position at a time $t_3$, then the swash plate tilting of the pump 10 is returned to a starting position at time $t_3$, and the displacement volume of the pump 10 decreases. When the signal $X_5$ of the operation lever 5 reaches one-half its maximum value, the judging circuit 71 judges that the hydraulic cylinders 4 be driven by the pump 1 alone. However, since tilting speed control is being effected, the swash plate tilting of pump 10 does not become zero and no signal is produced from the sensing circuit 77, so that the operational circuit 74 operates to provide a target tilting for keeping the swash plate tilting of the pump 1 at a maximum value. If the swash plate tilting of the pump 10 becomes zero at a time $t_5$, then a signal is produced from the sensing circuit 77 and the operational circuit 74 operates to provide a target tilting for reducing the swash plate tilting of the pump 1. At this time, the on-off valve *6a* is closed and the on-off valve *6b* is opened, and thus the displacement volume of the pump 1 begins to decrease thereby making the deceleration of the hydraulic cylinder 4 constant. The displacement volume of the pump 1 becomes zero at a time $t_6$, and the cylinders 4 are rendered inoperative. If the operation lever 5 is manipulated one-half its maximum amount, then the judging circuit 71 judges that the pump 1 alone should be hydraulically connected to the hydraulic cylinders 4. Thus, the displacement volume of the pump 1 increases and the speed of the cylinder 4 reaches one-half the maximum speed thereof at a time $t_8$. If the operation lever 50 is manipulated at a time $t_9$, then the pump 10 is immediately hydraulically connected to the hydraulic cylinder 40 because the displacement volume of the pump 10 is zero at this time.

Referring to FIG. 7, the priority order judging circuit 71 of the control unit 7 comprises a window comparator 711 which produces 'o' when the absolute value of a signal $X_5$ from the operation lever 5 is equal to or below one-half its maximum value and produces '1' when it exceeds the maximum value, and another window comparator 712 which produces '1' in response to a signal $X_{50}$ from the operation lever 50 except when it is in the dead zone. The output signals of the window comparator 711 and 712 are inputted to a logical circuit 713 comprising a NOT circuit 713*a* and an AND circuit 713*b*, and the output signal of the AND circuit 713*b* is supplied to the valve switch timing circuit 72 and operational circuit 74. The relation between a and b inputs and a c output of the logical circuit 713 are as shown in FIG. 8.

Referring to FIG. 9, the maximum tilting sensing circuit 76 comprises a comparator 761 for comparing a signal $Y_3$ from the displacement meter 3 and a reference value $V_{L2}$, and producing '1' when $V_{L2} \geqq Y_3$, and 'o' when $V_{L2} < Y_3$, a comparator 762 for comparing the signal $Y_3$ from the displacement meter 3 and a reference value $V_{u2}$, and producing '1' when $Y_3 \geqq V_{u2}$, and 'o' when $Y_3 < V_{u2}$, and an OR circuit receiving output signals from the comparators 761 and 762 and supplying an output signal to the operational circuit 74 for calculating target tiltings. As the reference value $V_{L2}$, the minimum or negative maximum value of the signal $Y_3$ of the displacement meter 3 (corresponding to the minimum or negative maximum swash plate tilting of the pump 1) is set, and as the reference value $V_{u2}$, the positive maximum value of the signal $Y_3$ of the displacement meter 3 (corresponding to the positive maximum swash plate tilting of the pump 1) is set. Thus, as shown in FIG. 10, the circuit 76 constitutes a window comparator which produces 'o' when the signal $Y_3$ of the displacement meter 3 is positive and smaller than its maximum value and when it is negative and its absolute value is smaller than the absolute value of the maximum negative value and produces '1' when the signal $Y_3$ of the displacement meter 3 shows the positive and negative maximum values.

As shown in FIG. 11, the zero tilting sensing circuit 77 comprises a comparator 771 for comparing a signal $Y_{30}$ from the displacement meter 30 and a reference value $V_{L3}$, and producing '1' when $V_{L3} \geqq Y_{30}$ and producing 'o'when $V_{L3} < Y_{30}$, a comparator 772 for comparing the signal $Y_{30}$ from the displacement meter 30 and a reference numeral $V_{u3}$, and producing '1' when $Y_{30} \geqq V_{u3}$ and producing 'o' when $Y_{30} < V_{u3}$, and an OR circuit 773 receiving output signals of the comparators 771 and 772 and supplying an output signal to the valve switch timing circuit 72 and the target tilting operational circuit 74. As reference values $V_{L3}$ and $V_{u3}$, the lower end upper limit values of the dead zone of the signal $Y_{30}$ of the displacement meter 30 are set, respectively. Thus, as shown in FIG. 12, the circuit 77 constitutes a window comparator producing 'o' when the signal $Y_{30}$ of the displacement meter 30 is zero or in the dead zone and producing '1' when the signal $Y_{30}$ exceeds the dead zone and its absolute value increases.

As shown in FIG. 13, the valve switch timing circuit 72 comprises an OR circuit 722 for inputting the output signal of the juding circuit 71 and the output signal of the zero tilting sensing circuit 77, an OR circuit 723 inputting the output signal of the circuit 71 via a NOT circuit 721 and inputting the output signal of the circuit 77 as it is, and an RS flip-flop circuit 724 inputting the output signals of the OR circuits 722 and 723 at S and R terminals and supplying an output signal from a $\overline{Q}$ terminal to the valve drive circuit 73 and target tilting operational circuit 74. The relationship between the S and R inputs and the $\overline{Q}$ output of the RS flip-flop circuit 724 is as shown in FIG. 14.

Figure 15:
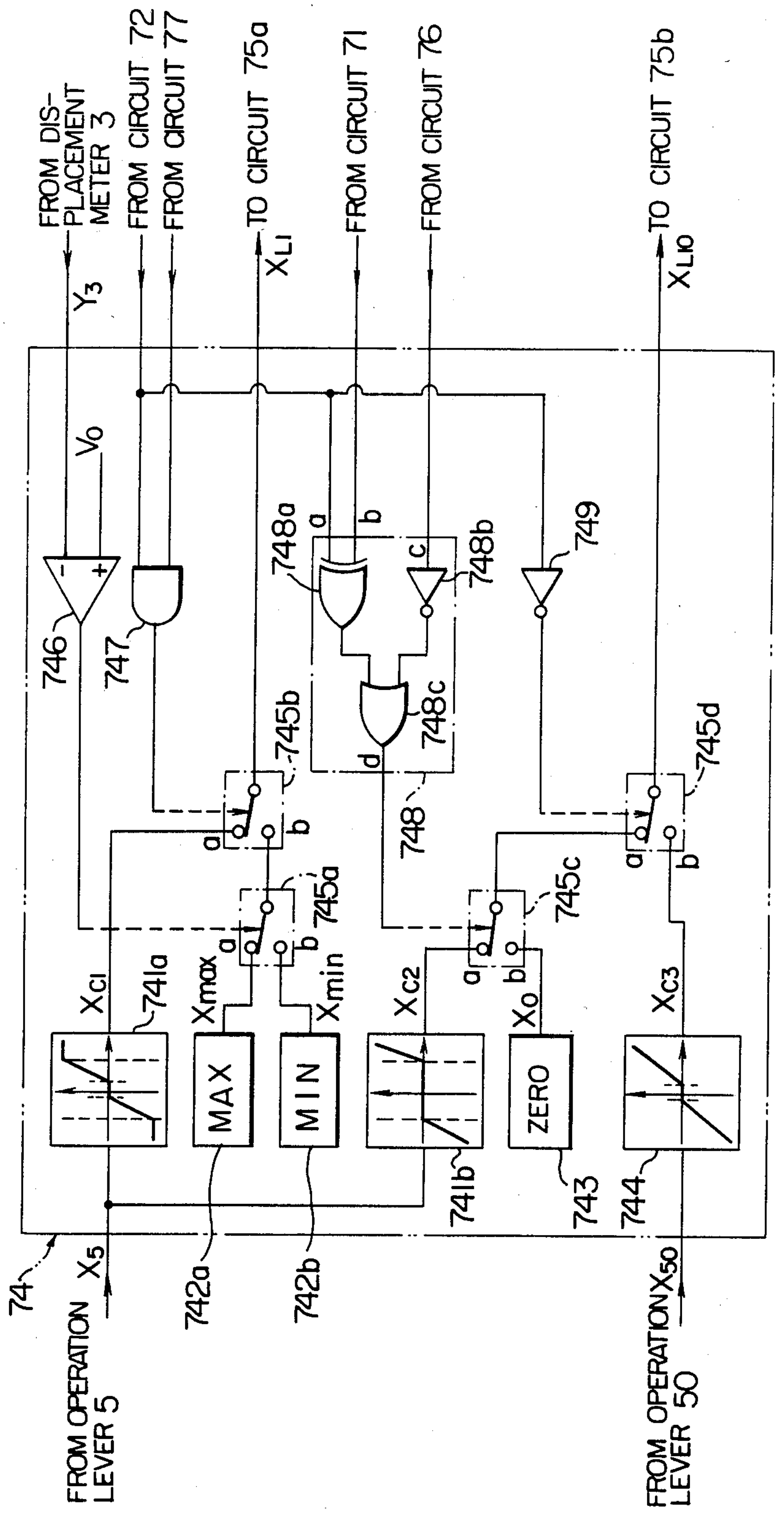
FIG. 15 is a circuit diagram of the target tilting operational circuit of the control system shown in FIG. 5.

As shown in FIG. 15, the target tilting operational circuit 74 comprises a first function generator 741*a* for producing a target tilting signal $X_{c1}$ for the first pump 1 which signal has its absolute value increase in proportion to an increase in the absolute value of a signal $X_5$ of the operation lever 5 until the absolute value of the signal $X_5$ exceeds the dead zone and reaches one-half its maximum value and which signal becomes constant when the absolute value of the signal $X_5$ reaches one-half its maximum value or become greater than that, and a second function generator 741*b* for producing a target tilting signal $X_{c2}$ for the second pump 10 which signal remains zero until the absolute value of the signal $X_5$ of the operation lever 5 reaches one-half its maximum value and has its absolute value increase in proportion to an increase in the absolute value of the signal $X_5$ as the absolute value of the signal $X_5$ reaches one-half its maximum value or greater than that. A target tilting signal $X_{c1}$ produced by the first function generator 741*a* when the signal $X_5$ of the operation lever 5 is positive and its value has reached one-half its maximum vaule is a signal for commanding a positive maximum swash plate tilting of the hydraulic pump 1, and a target tilting signal $X_{c1}$ produced thereby when the signal of the operation lever 5 is negative and its value has reached one-half its minimum value is a signal for commanding a negative maximum swash plate tilting of the hydraulic pump 1. A maximum tilting signal generator 742*a* produces a target tilting signal $X_{max}$ for commanding a positive maximum swash plate tilting of the first pump 1, and a minimum tilting signal generator 642*b* produces a target tilting signal $X_{min}$ for commanding a minimum or negative maximum swash plate tilting of the first pump 1. A zero tilting signal generator 743 produces a target tilting signal $X_o$ for commanding zero tilting or neutralization of the second pump 10.

The operational circuit 74 for determining target tilting comprises a third function generator 744 for producing a target tilting signal $X_{c3}$ for the second pump 10 which has its absolute value increase as the absolute value of a signal $X_{50}$ of the operation lever 50 exceeds the dead zone and increases.

One of the output signals $X_{c1}$, $X_{max}$ and $X_{min}$ of the first function generator 741, maximum tilting signal generator 742*a* and minimum tilting signal generator 742*b* is selected by switches 745*a* and 745*b* and supplied to a control section 75*a* for the first pump 1 as a target tilting signal $X_{L1}$. One of the output signals $X_{c2}$, $X_{c3}$ and $X_o$ of the second and third function generators 741*b* and 744 and zero tilting signal generator 743 is selected by switches 745*c* and 745*d* and supplied to a control section 75*b* for the second pump 10 as a target tilting signal $X_{L10}$.

The switches 745*a*, 745*b*, 745*c* and 745*d* are respectively actuated by a comparator 746, an AND circuit 747, a logical circuit 748 and a NOT circuit 749.

The comparator 746 produces '1' when a signal $Y_3$ of the displacement meter 3 is smaller than a reference value $V_o$ to change the switch 745*a* to a b terminal side. The reference value $V_o$ corresponds to the output of the displacement meter 3 when the tilting of the pump 1 is zero. The AND circuit 747 produces '1' when the output signals of the valve switch timing circuit 72 and the zero tilting sensing circuit 77 are both '1' to change the switch 745*b* to the b terminal side.

Figures 16, 18:
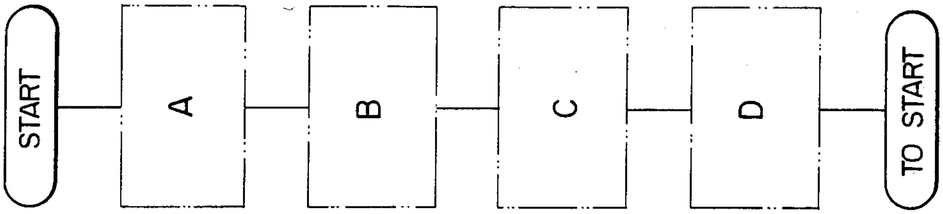
FIG. 16 is a table showing the relationship between the inputs and output of the logical circuit of the target tilting operational circuit shown in FIG. 15.
FIG. 18 is a view showing the partial flow charts A, B, C and D as connected together of the control system according to the invention by using a microcomputer.

The logical circuit 748 comprises an EXOR circuit 748*a* receiving output signals from the valve switch timing circuit 72 and the judging circuit 71, a NOT circuit 748*b* receiving an output signal from the EXOR circuit 748*a*, and an OR circuit 748*c* receiving output signals from the EXOR circuit 748*a* and NOT circuit 748*b*. The relation between the inputs and the output of the logical circuit 748 is such that, as shown in FIG. 16, '1' is produced as an output except when inputs are all '1, to change the switch 745*c* to the b terminal side.

The NOT circuit 749 produces a '1' when the output signal of the timing circuit 72 is 'o' to change the switch 745*d* to the b terminal side.

Figure 17:
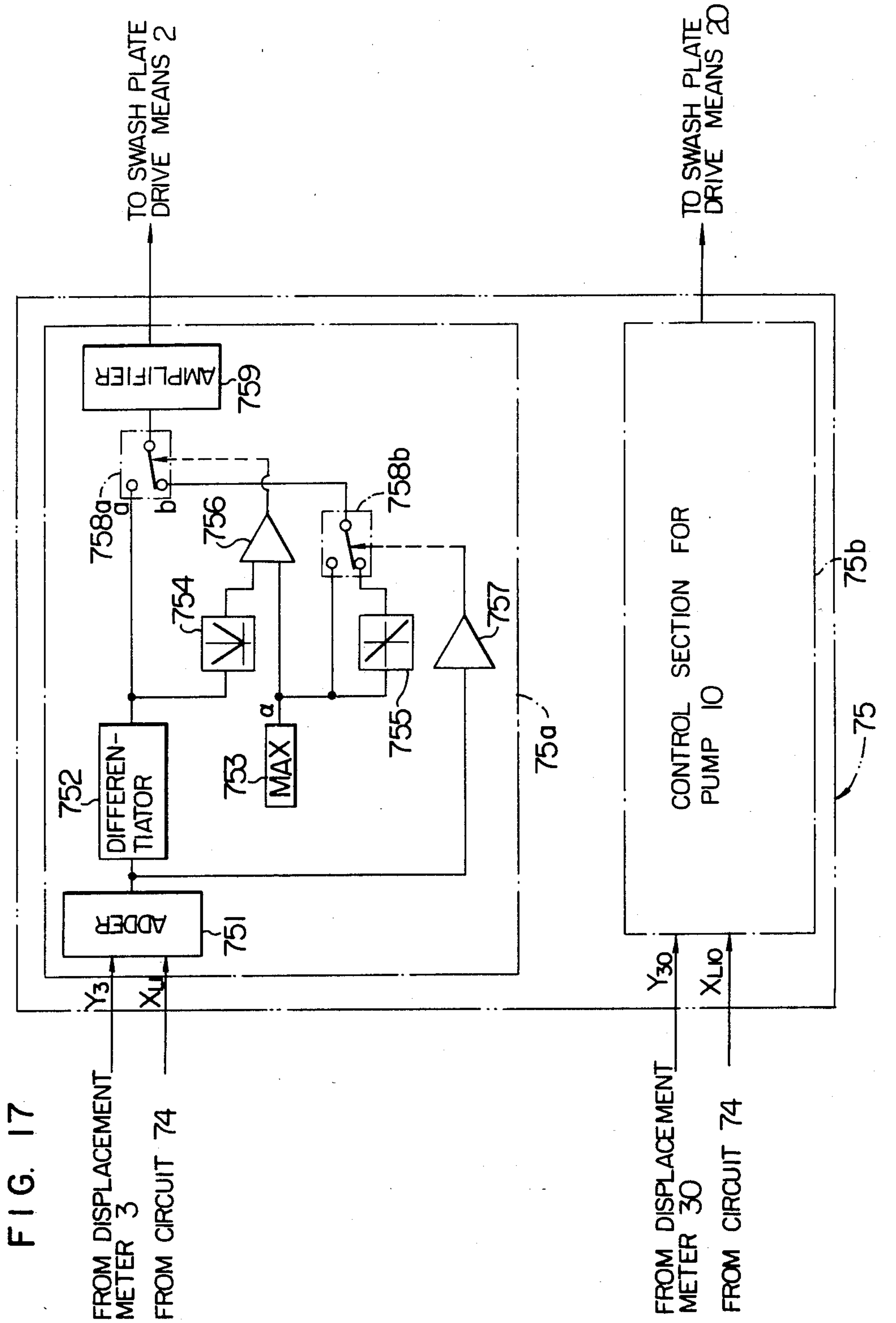
FIG. 17 is a circuit diagram of the tilting control circuit of the control system shown in FIG. 5.
Figure 19:
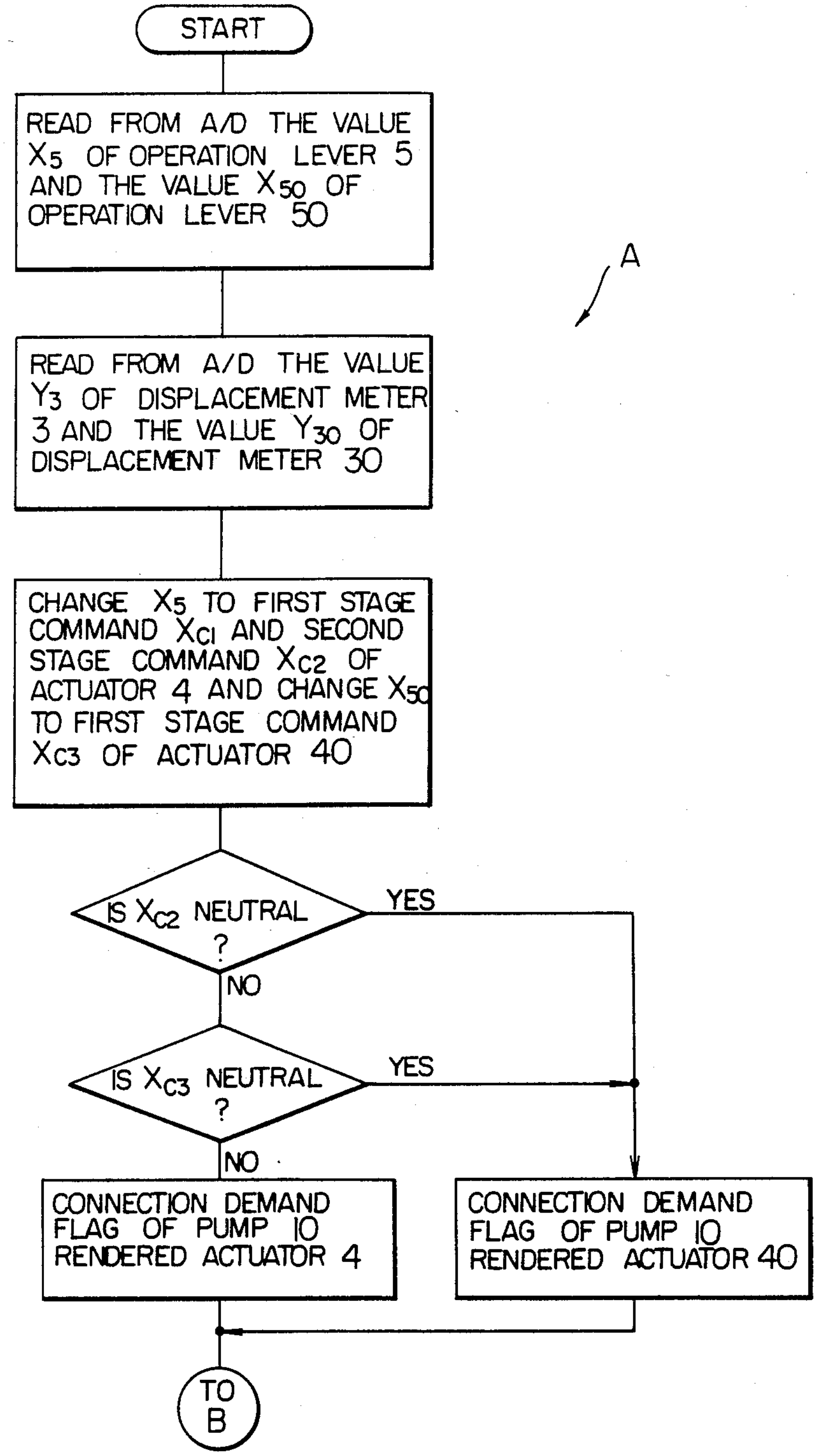
FIGS. 19, 20, 21 and 22 are views showing the contents of the partial flow charts A, B, C and D respectively shown in FIG. 18.
Figure 20:
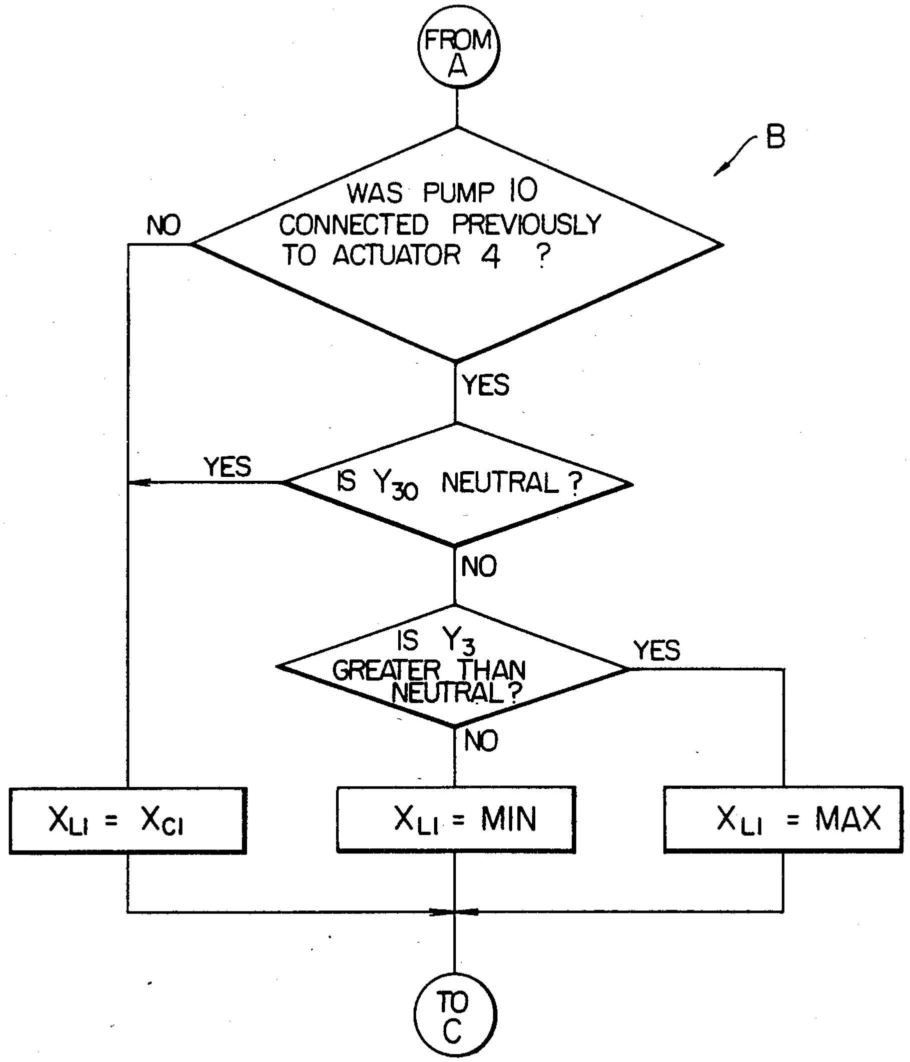
Figure 21:
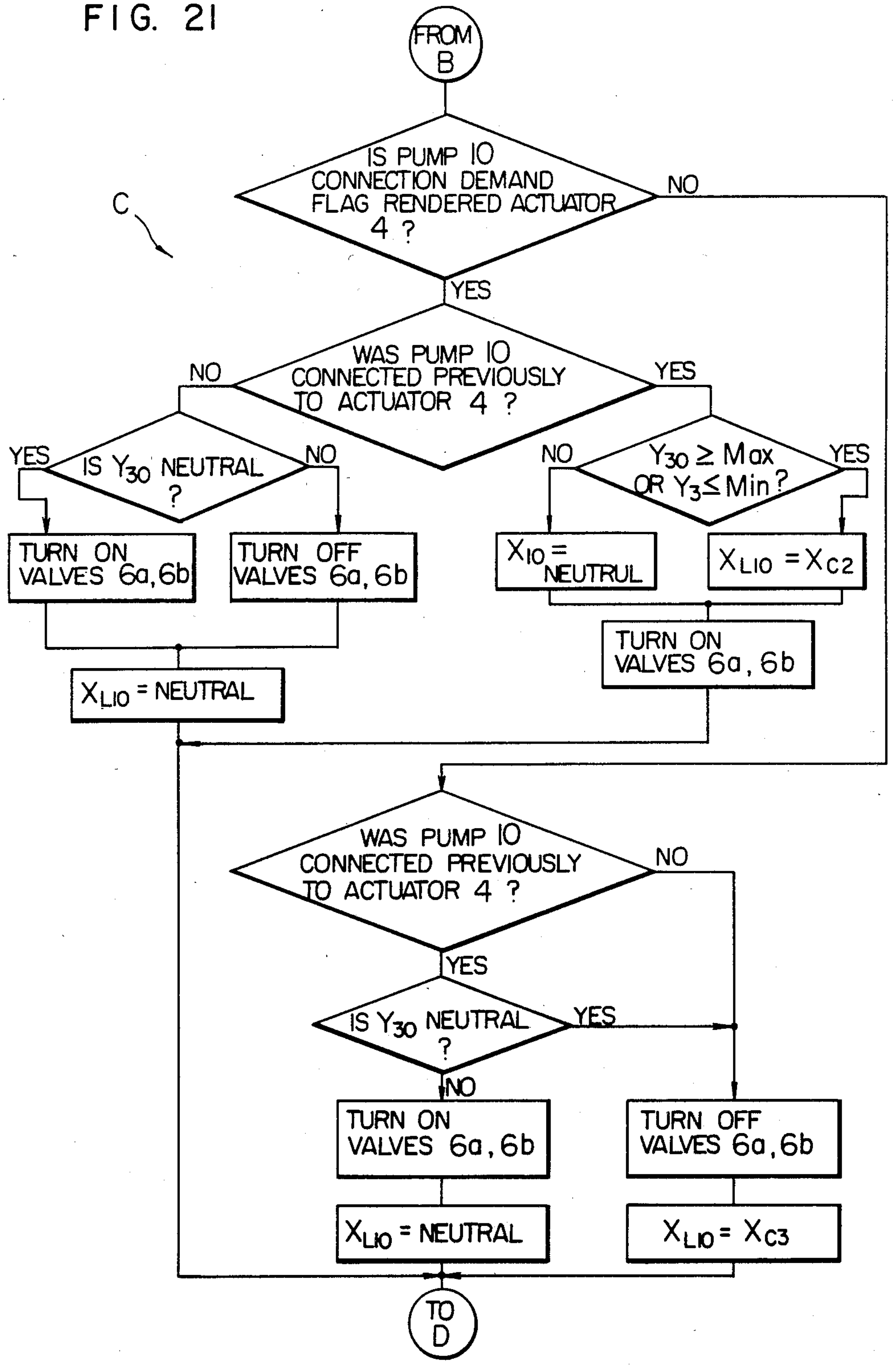
Figure 22:
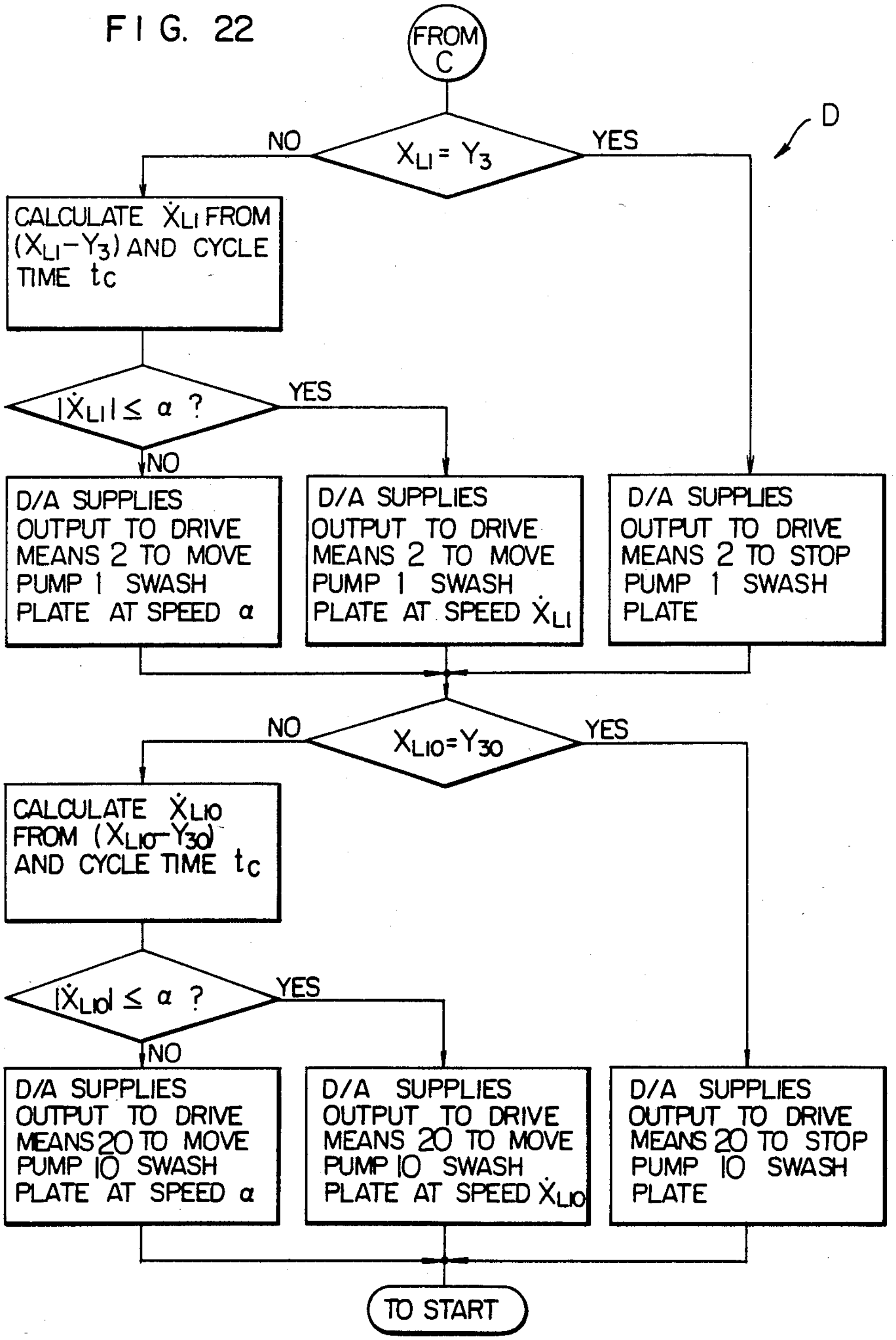

As shown in FIG. 17, the control section 75*a* for the first pump 1 of the tilting control circuit 75 comprises an adder 751 comparing the target tilting signal $X_{L1}$ from the switch 745*b* of the circuit 74 and the signal $Y_3$ of the displacement meter 3 for doing calculation on $\Delta Y_3 = X_{L1} - Y_3$, a differentiator 752 for differentiating the output $\Delta Y_3$ of the adder 751 and doing calculation on $$\frac{d\Delta Y_3}{dt},$$

an absolute value circuit 754 for obtaining $$\left|\frac{d\Delta Y_3}{dt}\right|,$$

and a comparator 756 for comparing $$\left|\frac{d\Delta Y_3}{dt}\right|$$

and an output $\alpha$ of a set maximum speed generator 753. The comparator 757 performs comparison of the sign of the output $\Delta Y_3$ of the adder 751 and produces '1' when $\Delta Y_3 \geqq 0$ to change a switch 758*b* to an a terminal side and produces 'o' when $\Delta Y_3 < 0$ to change a switch 758*b* to a b terminal side. A reversing circuit 755 reverses the sign of the output $\alpha$ of the generator 753. Thus, if $\Delta Y_3 \geqq 0$, then the output $\alpha$ of the generator 753 is supplied as it is to the switch 758*a* and if $\Delta Y_3 < 0$, then the output $\alpha$ is supplied to the switch 758*a* after its sign is reversed. In the comparator 756, the output $\alpha$ of the generator 753 and the output $$\left|\frac{d\Delta Y_3}{dt}\right|$$

of the absolute value circuit 754 are compared with each other, and the switch 758*a* is changed to an a terminal side when $$\alpha \geqq \left|\frac{d\Delta Y_3}{dt}\right|$$

and changed to a b terminal side thereof when $$\alpha < \left|\frac{d\Delta Y_3}{dt}\right|.$$

The output selected by the switch 758*a* is amplified by an amplifier 759 and supplied as its output to the swash plate drive means 2. The swash plate tilting speed of the pump 1 is controlled in this fashion so that it may not exceed the set maximum speed $\alpha$.

The control section 75*b* for the second pump 10 is of the same construction as the control section 75*a* for the first pump 1, so that description thereof shall be omitted.

Although not shown, the valve drive circuit 73 comprises an amplifier for amplifying the output signals of the valve switch timing circuit 72.

Operation of the control unit 2 of the aforesaid construction will be described by referring to the time chart shown in FIG. 6.

Time $t_o$–$t_1$

The output signal $X_5$ of the operation lever 5 is one-half or less than one-half of its maximum value and the output signal $X_{50}$ of the operation signal $X_{50}$ is zero. Thus, in the judging circuit 71, the comparators 711 and 712 both produce 'o' as an output, and the output signal of the logical circuit 713 becomes 'o'. In the zero tilting sensing circuit 77, the signal $Y_{30}$ of the displacement meter 30 is zero, so that the comparators 771 and 772 produce 'o' as an output, and the output of the OR circuit 773 is 'o'. In the valve switch timing circuit 72, the output of the circuit 71 is 'o' and the output of the circuit 77 is 'o', so that the $\overline{Q}$ terminal output of the RS flip-flop circuit 724 becomes 'o'. Thus, the on-off valves 6*a* and 6*b* are held in closed and open positions, respectively.

In the operational circuit 74 for determining target tilting, the output of the circuit 72 is 'o' and the output of the circuit 77 is 'o', so that the AND circuit 747 produces 'o' as an output and the switch 745*b* is located on the a terminal side. The NOT circuit 749 produces '1' as an output, so that the switch 745*d* is located on the b terminal side. Thus, the signal $X_5$ of the operation lever 5 is changed into a target tilting signal $X_{c1}$ at the first function generator 741*a* and the signal $X_{c1}$ is selected by the switch 745*b* and supplied to the control section 75*a* for the first pump 1 of the tilting control circuit 75 as a target tilting signal $X_{L1}$ for the first pump 1. Thus, the swash plate tilting or the displacement volume of the first pump 1 is controlled in accordance with the target tilting signal $X_{c1}$. In the tilting control circuit 75, control is effected such that the maximum value of the tilting speed is limited to $\alpha$, so that the displacement volume of the pump 1 is not maximized at time $t_1$. As a target tilting signal $X_{L10}$ for the second pump 10, the output $X_{c3}$ of the third function generator 747 is selected by the switch 745*d*, and the swash plate tilting or the displacement volume of the second pump 10 is held at a level zero because the signal $X_{50}$ of the operation lever 50 is zero at this time.

Time $t_1$–$t_2$

At time $t_1$, the signal $X_5$ of the operation lever 5 exceeds one-half its maximum value, and thus the output of the window comparator 711 becomes '1' in the judging circuit 71. Since the output of the window comparator 712 is 'o', the output of the logical circuit 713 becomes '1'. In the zero tilting sensing circuit 77, the outputs of the comparators 771 and 772 are both 'o', so that the output of the OR circuit 773 is also 'o'. In the timing circuit 72, the output of the circuit 71 is '1' and the output of the circuit 77 is 'o', so that the $\overline{Q}$ terminal output of the RS flip-flop circuit 724 becomes '1'. Thus, at time $t_1$, the valves 6*a* and 6*b* are changed to open and closed positions, respectively.

In the maximum tilting sensing circuit 76, the signal $Y_3$ of the displacement meter 3 does not reach its maximum value yet, so that the comparators 761 and 762 both produce 'o' as an output and the OR circuit 763 also produces 'o'.

In the target tilting operational circuit 74, the output of the circuit 72 is '1' and the output of the circuit 77 is 'o', so that the AND circuit produces 'o' as an output and the switch 745*b* is held on the a terminal side. The output of the circuit 71 is '1' and the output of the circuit 72 is 'o', so that the output of the circuit 76 is 'o'. This results in the logical circuit 748 producing '1' to change the switch 745*c* to a b terminal side. The NOT circuit 749 produces 'o' as an output and the switch 745*d* is changed to the a terminal side. Thus, as the target tilting signal $X_{L1}$ for the first pump 1, the output signal $X_{c1}$ of the first function generator 711 is produced, and as the target tilting signal $X_{L10}$ for the second pump 10, the output signal $X_o$ of the zero tilting signal generator 753 is supplied as an output through the switches 745*c* and 745*d*.

The aforesaid operation is continued up to time $t_2$. Thus, the displacement volume of the first pump 1 is controlled in accordance with the target tilting signal and maximized at time $t_2$ while having the maximum value of the tilting speed limited to $\alpha$ by the tilting control circuit 75, and the displacement volume of the second pump 10 is kept zero up to time $t_2$.

Time $t_2$–$t_3$

At time $t_2$, the displacement volume of the first pump 1 is maximized, and thus the signal $Y_3$ of the displacement meter 3 indicates a maximum value. In the maximum tilting sensing circuit 76, the output of the comparator 762 becomes '1' and the OR circuit 763 produces '1' as an output. The outputs of the circuits 71 and 72 remain '1' and the output of the circuit 77 remains 'o'. Thus, in the operational circuit 74 for determining target tilting, the AND circuit 747 remains 'o' and the switch 745*b* is held at the a terminal side, so that the output $X_{c1}$ of the function generator 741 continues to be produced as a target tilting signal $X_{L1}$ for the first pump 1. In the logical circuit 748, the outputs of the circuits 71, 72 and 76 are all '1', so that the logical circuit 748 produces 'o' as an output to change the switch 745*c* to the a terminal side. The switch 745*d* is held at the a terminal side. Thus, the signal $X_5$ of the operation lever 5 is changed by the second function generator 741*b* to a target tilting signal $X_{c2}$, which is selected by the switches 745*c* and 745*d* and supplied to the control section 75*b* for the second pump 10 of the tilting control circuit 75 as a target tilting signal $X_{L10}$ for the second pump 10. Accordingly, the displacement volume of the second pump 10 is controlled in accordance with the output $X_{c2}$ of the second function generator 741*b* while having the maximum value of the tilting speed limited to $\alpha$ by the circuit 75. Thus, the second pump 10 begins to increase its displacement volume.

As the second pump 10 begins to increase its displacement volume, the signal $Y_{30}$ of the displacement meter 30 is not zero and the output of the comparator 772 becomes '1' in the zero tilting sensing circuit 77, so that the OR circuit 773 produces '1' as an output. Thus, the output of the circuit 77 changes from 'o' to 1, but the $\overline{Q}$ terminal output of the RS flip-flop circuit 724 is held at 1' in the timing circuit 72. Accordingly, in the operational circuit 74 for determining target tilting, the AND circuit 747 produces '1' as an output because its inputs are both '1' to change the switch 745*b* to the b terminal side. At this time, the output $Y_3$ of the displacement meter 3 shows a positive maximum value, so that the comparator 746 produces 'o' to change the switch 745*a* to the a terminal side. Accordingly, the output $X_{max}$ of the maximum tilting signal generator 741*a* is selected by the switches 745*a* and 745*b* and supplied as a target tilting signal $X_{L1}$ for the first pump 1. At this time, the outputs of the circuits 71, 72 and 76 are the same as those obtained at time $t_2$, so that the output $X_{c2}$ of the second function generator 741*b* continues to be produced as a target tilting signal $X_{L10}$ for the second pump 10.

Thus, when the displacement volume of the first pump 1 is maximized at time $t_2$, the second pump 10 begins to increase its displacement volume, and thereafter the displacement volume of the second pump 10 is controlled in accordance with the target tilting signal $X_{c2}$ and increases while the maximum value of the tilting speed is limited to $\alpha$ by the circuit 75, and the displacement volume of the first pump 1 is kept at a maximum value. At this time, the on-off valves 6*a* and 6*b* are in open and closed positions, respectively, as aforesaid. Accordingly, the acceleration of the hydraulic cylinder 4 becomes constant as shown in FIG. 6(*e*).

Time $t_3$–$t_4$

In the operational circuit 74, signals acting on the switches 745*a*, 745*b*, 745*c* and 745*d* are all same as the signals obtained at the time $t_2$–$t_3$. Thus, the displacement volume of the first pump 1 is kept at its maximum value by the output $X_{max}$ of the maximum tilting signal generator 742, and the displacement volume of the second pump 10 is controlled in accordance with the output $X_{c2}$ of the second function generator 741*b* while having the maximum value of the tilting speed limited by the tilting control circuit 75.

Time $t_4$–$t_5$

At this time, the signal $X_5$ of the operation lever 5 becomes one-half or below one-half its maximum value, so that the outputs of the window comparators 711 and 712 of the judging circuit 71 both become 'o' and the output of the logical circuit 713 also becomes 'o'. In the timing circuit 72, the output of the circuit 77 remains '1', so that the RS flip-flop circuit 724 continues to produce '1' as an output.

In the operational circuit 74, the output of the AND circuit 747 and the comparator 746 remains unchanged, so that the output $X_{max}$ of the maximum tilting signal generator 742*a* continues to be produced as a target tilting signal $X_{L1}$ for the first pump 1 through the switches 745*a* and 745*b*. Also, in the logical circuit 748, the signal from the circuit 71 which is one of the inputs becomes 'o', so that '1' is produced as an output to change the switch 745c to the b terminal side. The switch 745d is held at the a terminal side. Thus, the output $X_o$ of the zero tilting signal generating circuit 743 is selected by the switches 745c and 745d and produced as a target tilting signal $X_{L10}$ for the second pump 10. Accordingly, the displacement volume of the first pump 1 is held at a maximum value and the displacement volume of the second pump 10 is controlled in accordance with the target tilting signal $X_o$ and decreases until it becomes zero while having the maximum value of tilting speed limited to $\alpha$ by the circuit 75.

Time $t_5$–$t_6$

At time $t_5$, the displacement volume of the second pump 10 becomes zero, and thus the signal $Y_{30}$ of the displacement meter 30 becomes zero and the output of the zero tilting sensing circuit 77 becomes 'o'. The output of the judging circuit 71 being also 'o', the output of the timing circuit 72 becomes 'o'. Thus, the on-off valves 6a and 6b are switched to closed and open positions, respectively.

In the operational circuit 74, the inputs of the AND circuit 747 both become 'o', so that the switch 745b is changed to the a terminal side. Accordingly, the output $X_{c1}$ of the first function generator 741a is selected by the switch 745b and supplied as a target tilting signal $X_{L1}$ for the first pump 1. Also, the input of the NOT circuit 749 being 'o', it produces '1' as an output to change the switch 745d to the b terminal side. Accordingly, the output $X_{c3}$ of the third function generator 747 is selected by the switch 745d and supplied as a target tilting signal $X_{L10}$ for the second pump 10.

Thus, the displacement volume of the first pump 1 is controlled in accordance with the target tilting signal $X_{c1}$ and begins to decrease while having the maximum value of tilting speed limited to $\alpha$ by the circuit 75, and the displacement volume of the second pump 10 is being maintained at zero.

As the displacement volume of the first pump 1 beings to decrease, the signal $Y_3$ of the displacement meter 3 ceases to be maximum and the output of the maximum tilting sensing circuit 76 becomes 'o'. However, the outputs of the circuits 72 and 77 remain unchanged, so that the switches 745b and 745d remain being held at the a and b terminal sides, respectively. Accordingly, the operation condition prevailing at time $t_5$ continues.

Thus, when the displacement volume of the second pump 10 becomes zero at time $t_5$, the displacement volume of the first pump 1 begins to decrease and the displacement volume of the first pump 1 is controlled in accordance with the target tilting signal $X_{c1}$ and decreases while having the maximum value of tilting speed limited to $\alpha$ by the circuit 75, and the displacement volume of the second pump 10 is being maintained at zero. Accordingly, the deceleration of the hydraulic cylinder 4 becomes constant as shown in FIG. 6(*e*).

Time $t_7$–$t_8$

At this period, the signal $X_5$ of the operation lever 5 is one-half or below one-half its maximum value and the signal $X_{50}$ of the operation lever 50 is zero, so that the operation condition of the control unit is the same as the operation condition thereof at the time $t_o$–$t_1$. Thus, the displacement volume of the first pump 1 is controlled in accordance with the output $X_{c1}$ of the first function generator 741a and becomes maximum at time $t_8$ while having the maximum value of tilting speed limited to $\alpha$ by the circuit 75. The displacement volume of the second pump 10 is held at zero in accordance with the output $X_{c3}$ of the third function generator 747.

Time $t_8$–$t_9$

As the displacement volume of the first pump 1 is maximized at time $t_8$, the maximum tilting sensing circuit 76 produces '1' as an output. However, the circuits 72 and 77 have 'o' for thier inputs, so that the outputs of the AND circuit 747 and NOT circuit 749 remain unchanged. Thus, the displacement volume of the first pump 1 is controlled by the output $X_{c1}$ of the first function generator 741a and maintained at a maximum value, as is the case with the displacement volume of the first pump 1 at the time $t_7$–$t_8$. The displacement volume of the second pump 10 is also held at zero. This operation condition continues until time $t_9$.

Time $t_9$~

At time $t_9$, the signal $X_{50}$ of the operation lever 50 ceases to be maximum, so that the output of the window comparator 712 of the judging circuit 71 becomes '1'. However, the output of the window comparator 711 remains 'o', so that the output of the logical circuit 713 remains 'o' also. The output of the zero tilting sensing circuit 77 is also 'o', so that the output of the timing circuit 72 also remains 'o'. Thus, the inputs of the AND circuit 747 and NOT circuit 749 remain unchanged, so that the switches 745b and 745d are on the a and b terminal sides, respectively. Accordingly, the displacement volume of the first pump 1 is held at a maximum value by the output of the first function generator 741a, and the displacement volume of the second pump 10 is controlled by the output $X_{c3}$ of the third function generator 747 and begins to increase while having the maximum value of tilting speed limited to $\alpha$ by the circuit 75.

As the displacement volume of the second pump 10 begins to increase, the zero tilting sensing circuit 77 produces '1' as an output. However, the output of the timing circuit 72 remains 'o' because the output of the circuit 71 is 'o'.

In the operational circuit 74, the circuit 747 produces 'o' as an output because the signal of the circuit 72 which is one of its inputs. Thus, the switch 745a is held at the a terminal side. The switch 745d is also held at the b terminal side. Accordingly, the operation condition prevailing at time $t_9$ continues and the displacement volume of the second pump 10 increases to its maximum value while the displacement volume of the first pump 1 is maintained at a maximum value.

Accordingly, the changes which the displacement volume of the first and second pumps 1 and 10 undergo are minimized in incidence.

The control unit 7 has been described as being in the form of an operational unit including analogue circuits. However, the control unit 7 may be in the form of a microcomputer.

FIGS. 18–22 show an embodiment of the invention in which the control unit 7 is in the form of a microcomputer. FIG. 18 shows connection of partial flow charts A, B, C and D, and FIGS. 19–22 show the detailed contents of the partial flow charts A, B, C and D. It will be readily understood that the control unit 7, when constructed in the form of a microcomputer, is capable of operating in the same manner as described by referring to the embodiment in which the control unit 7 is in the form of comprising analogue circuits described hereinabove.

In the embodiment described hereinabove, the actuator is a hydraulic cylinder, but it will be appreciated that the invention can have application in cases where the actuator is a hydraulic motor. In the embodiment described hereinabove, two hydraulic pumps have been described, but it will be also appreciated that one actuator may be connected to three or more actuators. In this case, it goes without saying that it is possible to sense swash plate tilting of each hydraulic pump to successively increase or decrease the displacement volumes thereof by deciding the order of priority for hydraulic connection between the actuator and various hydraulic pumps. In the embodiment described hereinabove, swash plate tilting speed has been set constant in controlling the swash plate tilting speed. However, the swash plate tilting speed may be varied depending on the actuator connected to the hydraulic pumps.

From the foregoing description, it will be appreciated that in the control system of a hydraulic circuit according to the invention, acceleration or deceleration of the actuator is constant, so the apparatus has high operability and is free from shock, and, in the event that the operation lever of another actuator is manipulated while one actuator is being driven for actuation, the actuator begins to operate as soon as the operation lever is manipulated, and also changes in the displacement volume of the hydraulic pump can be minimized in incidence.

What is claimed is:

1. A hydraulic circuit system comprising:

a hydraulic circuit apparatus having at least first and second variable displacement hydraulic pumps, at least first and second hydraulic actuators driven by the first and second pumps, hydraulic connections connecting said first hydraulic actuator with said first and second pumps and said second hydraulic actuator with said second pump, and valve means for controlling the hydraulic connections between the second pump and the first and second actuators; and control means associated with said first and second pumps and said valve means for controlling the displacement volumes of the first and second pumps and said hydraulic connections to thereby control the operations of said first and second actuators, said control means including;

means setting order of priority of the hydraulic connections between the first actuator and the first and second hydraulic pumps and an order of priority of the hydraulic connections between the second hydraulic pump and the first and second actuators;

means for sensing the displacement volume of the first hydraulic pump;

first means for sensing maximization of the sensed displacement volume of the first hydraulic pump;

means for sensing the displacement volume of the second hydraulic pump;

second means for sensing that the second displacement volume of the second hydraulic pump has become substantially zero; and means for deciding target displacement volumes of the first and second hydraulic pumps based on information supplied at least by said priority order setting means and said first and second sensing means such that when the flow rate of hydraulic fluid supplied to the first actuator is increased, the displacement volume of the second hydraulic pump is increased from substantially zero after the displacement volume of the first hydraulic pump is maximized and, when the flow rate of hydraulic fluid supplied to the first actuator is reduced, the displacement volume of the first hydraulic pump is reduced after the displacement volume of the second hydraulic pump has become substantially zero.

2. A hydraulic circuit system as claimed in claim 1, wherein said priority order setting means comprises means for judging whether or not a first operation signal indicative of the operation of the first actuator is greater than a predetermined value, and means for judging whether or not a second operation signal indicative of the operation of the second actuator is substantially zero.

3. A hydraulic circuit system as claimed in claim 1, wherein said target displacement volume deciding means comprises first means for deciding the target displacement volume of the first hydraulic pump based on a first operation signal indicative of the operation of the first actuator, second means for deciding the target displacement volume of the second hydraulic pump based on the first operation signal, third means for deciding the target displacement volume of the second hydraulic pump based on a second operation signal indicative of the operation of the second actuator, and means for selecting, as a target displacement volume of the second hydraulic pump, the target displacement volume decided by the second means when the displacement volume of the first hydraulic pump is maximized and when the second operation signal is substantially zero.

4. A hydraulic circuit system as claimed in claim 3, wherein said target displacement volume deciding means further comprises means for selecting, as a target displacement volume of the second hydraulic pump, the target displacement volume decided by the third means when the second operation signal is not substantially zero.

5. A hydraulic circuit system as claimed in any one of claims 1–4, wherein said control means further comprises means for deciding switch timing for said valve means based on information supplied by said priority order setting means and said second sensing means.

6. A hydraulic circuit system as claimed in any one of claims 1–4, wherein said control means further comprises means for deciding the rate of changes in the displacement volumes of the first and second hydraulic pumps based on information supplied by said target displacement volume deciding means thereby to prevent the rate of changes from exceeding a predetermined level.

* * * * *